(12) United States Patent
Maldonado et al.

(10) Patent No.: US 6,293,297 B1
(45) Date of Patent: Sep. 25, 2001

(54) AIR VALVE HOUSING WITH PRESSURE INDICATOR

(76) Inventors: Brandon Maldonado, 19862 LeMans Cir., Yorba Linda, CA (US) 92886; Gene Scott, 3151 Airway Ave., Suite K-105, Costa Mesa, CA (US) 92626

( * ) Notice: Subject to any disclaimer, the term of this patent is extended or adjusted under 35 U.S.C. 154(b) by 0 days.

(21) Appl. No.: 09/360,889

(22) Filed: Jul. 26, 1999

(51) Int. Cl.$^7$ .................................................. B60C 23/02
(52) U.S. Cl. .................... 137/227; 137/224; 73/146.8; 116/34 R
(58) Field of Search ............................ 137/227, 223, 137/224; 73/146.8; 116/34 R

(56) References Cited

U.S. PATENT DOCUMENTS

| | | |
|---|---|---|
| 1,079,704 | 11/1913 | Hathaway . |
| 1,156,268 | 10/1915 | Bromberg . |
| 1,176,338 | 3/1916 | Bromerg . |
| 1,214,781 | 2/1917 | Harrison et al. . |
| 1,309,517 | 7/1919 | Gilbough . |
| 1,539,030 | 5/1925 | Sweetland . |
| 1,594,386 | 8/1926 | Stuart . |
| 1,807,752 | 6/1931 | Poster . |
| 3,230,968 * | 1/1966 | Struby ................................. 137/227 |
| 3,450,147 * | 6/1969 | Webb ................................... 137/226 |
| 3,572,283 * | 3/1971 | Ashman ........................... 137/227 X |
| 3,670,688 * | 6/1972 | Seaberg ............................... 116/34 R |
| 3,789,867 * | 2/1974 | Yabor ................................... 137/227 |
| 3,889,530 * | 6/1975 | Bluem ................................. 73/146.8 |
| 3,906,988 | 9/1975 | Mottram . |
| 3,969,936 | 7/1976 | Lindsay . |
| 3,994,312 * | 11/1976 | Tanner et al. ........................ 137/226 |
| 4,310,014 * | 1/1982 | Parker ................................... 137/227 |
| 4,445,527 * | 5/1984 | Leimbach ............................. 137/226 |
| 4,901,747 * | 2/1990 | Yabor ................................... 137/227 |
| 4,944,323 * | 7/1990 | Bartholomew et al. ............. 137/227 |
| 4,951,501 * | 8/1990 | MacAnally et al. ................ 73/146.8 |
| 5,027,848 * | 7/1991 | Leeuwen ............................. 137/227 |
| 5,535,623 | 7/1996 | Heyns . |
| 5,886,254 * | 3/1999 | Chi ..................................... 73/146.8 |
| 5,979,232 * | 11/1999 | Halcomb ............................ 73/146.8 |
| 6,055,854 * | 5/2000 | Chen ................................... 73/146.8 |

* cited by examiner

Primary Examiner—John Rivell
Assistant Examiner—Meredith H. Schoenfeld
(74) Attorney, Agent, or Firm—Gene Scott-Patent Law & Venture Group

(57) ABSTRACT

A tire pressure indicator is mounted onto the fill stem of a tire and provides a window for indicating if the tire has adequate pressure or not. The indicator show adequate, marginal and underinflated conditions by color bands opposite the window. The pressure indicator may be permanently mounted onto the tire and used to fill the tire and maintain pressure in the tire. As the tire is filled the indicator moves from one color band to the next until the indicator shows that adequate pressure has been attained whereupon the hose may be disconnected.

5 Claims, 2 Drawing Sheets

AIR VALVE HOUSING WITH PRESSURE INDICATOR

BACKGROUND OF THE INVENTION

1. Field of the Invention

This invention relates generally to air pressure level indicators for tires and the like, and more particularly to such an indicator capable of distinguishing between adequate, marginal and underinflated conditions in a tire.

2. Description of Related Art

The following art defines the present state of this field:

Lindsay, U.S. Pat. No. 3,969,936 describes an inflation valve gauge including a tubular stem having an inner end connected to a pressurized chamber such as formed by a tire, and an outer end provided with an inflation valve; the stem being surrounded by a special, helically wound Bourdon type pressure gauge tube, having an axially inner end penetrating a wall of the tubular stem and an outer end having a pointer overlying an axially directed scale plate; the gauge tube being surrounded by a sleeve which supports the scale plate and is joined to the stem axially inward from the gauge tube; the convolutions of the gauge tube being disposed in close proximity, the confronting wall surfaces of the stem and sleeve being in close proximity to the convolutions of the gauge tube to restrain the gauge tube against extreme mechanical forces tending to damage the gauge tube.

Heyns, U.S. Pat. No. 5,535,623 describes a tire pressure indicator which has a screw-threaded socket for long term but removable association with a tire valve. The body of the indicator houses a movable operator member; actuator member; and resilient member located between the operator member and actuator member. The arrangement is such that the actuator member is held in a "rest" position by the resilient means which is compressed when the actuator member is moved to a "test" position. The degree of compression and resilience of the resilient means are arranged such that the air release pin of the tire valve is depressed only in the event of air pressure in the tire being inadequate to counter the force exerted thereon through the resilient means. The sound of the air escaping in the "test" position is indicative of a low tire pressure.

Mottram, U.S. Pat. No. 3,906,988 describes a combined valve and wheel rim gauge for indicating visually whether the air pressure within the tire is adequate for safe operation. The device includes a flexible diaphragm which controls the movement of an indicating sleeve under varying conditions of internal air pressure to provide a continuous reading of under inflation, proper inflation and over inflation.

Poster, U.S. Pat. No. 1,807,752 describes an automobile tire pressure gauge or indicator, comprising a casing closed at its outer end and having sight openings intermediate its ends. The gauge has a base portion connected to the inner end of the casing. The base portion has an inwardly extending threaded part adapted to detachably engage with a valve stem. The base portion has an opening therethrough registering with the valve stem and having a bar adapted to engage the pin of the valve for maintaining the same open when the base portion is in position. A transparent cylinder mounted in the casing and having an opening through its inner end receives air from the base potion. A piston slidably mounted in the transparent cylinder which has surface portions of different colors is adapted to register past the sight openings during the movement of the piston, and a spring carried in the outer end of the cylinder for engaging against the outer end of the piston urges the latter inwardly against the air pressure.

Stuart, U.S. Pat. No. 1,594,386 describes a removable locked indicating valve stem comprises in combination an expandable air chamber in direct connection with the air in a pneumatic tire and in part a section of valve stem with metallic walls and in part a section of valve stem lined with a flexible rubber member actuated by a pressure spring opposed to the compressed air, an indicating member on the chamber's movable end and actuated by the spring indicating the variance of air pressure in the air chamber, a base member connected in juxtaposition with the pneumatic tire, a shut-off check valve in the base member, a removable tubular member threadably secured to said base member, and enlarged flange on the removable tubular member at its connecting end adapted to prevent it passing through the valve stem hole in the metal rim of the tire wheel from the tire side, and indicating scale on said tubular member in juxtaposition with said indicating member and adapted for indicating the pounds pressure, a sliding tubular member loosely mounted within the outer part of the removable tubular member and adapted to be forced across the opening in the metal walled part of the air chamber by the pressure of air from the supply tube so as to conduct the supply of air to the inlet connecting with the pneumatic tire.

Sweetland, U.S. Pat. No. 1,539,030 describes a pressure indicating device comprising a casing, a sleeve movable within said casing and provided with graduations, a tube having means embedded therein for preventing lateral while permitting longitudinal extension of the tube, and a coiled spring located in the annular space between the sleeve and the tube and arranged to resist the longitudinal extension of the latter.

Gilbough, U.S. Pat. No. 1,309,517 describes in combination with a vehicle wheel and an inflatable tire thereon, a movable pressure operated registering means in operative connection with the tire, and an arm connected to the wheel rim to be moved by movement of said means to project beyond the wheel and strike a stationary part of the vehicle when the tire is not properly inflated.

Harrison et al., U.S. Pat. No. 1,214,714 describes a tire pressure gauge, comprising the combination with the rim of a wheel and the inner tube of a tire, of a bushing tube secured to the rim and passing through the aperture in the same, a tire valve member endwise movable in the bushing tube, means for clamping the inner end of the member to the inner tube, the tire valve member adapted to be pressed outwardly by the inflation of the inner tube, resilient means opposing the outward movement and a tire inflating valve within the tire valve member, the tire valve member having a passage through the same controlled by the tire inflating valve whereby the inner tube of the tire may be inflated through the tire valve member.

Bromberg, U.S. Pat. No. 1,176,338 describes combined tire valve and pressure gauge, the combination of a base piece, an intermediate piece mounted therein provided with a valve seat at its lower end and a central hole longitudinally therethrough serving as an air conductor and with a chamber disposed in one side thereof with a port, the port and central hole terminating in the valve seat, and air valve covering the lower end of the central hole and the port in the valve seat, a plunger reciprocally mounted in the chamber, yielding means engaging with the plunger and means for indicating the pressure on the plunger in connection with the plunger.

Bromberg, U.S. Pat. No. 1,156,268 describes the combination of a tire valve stem, a cylindrical piece secured thereon provided with a curved valve seat with ports leading directly therefrom to the inner surface of said cylindrical piece, a valve mounted in the curved seat, and air conducting tube secured in the cylindrical piece, a valve stem mounted in the tube extending through the outer surface of the cylindrical piece, means for holding the valve seated, a plunger reciprocally mounted in the cylindrical piece, a pressure indicating means in connection therewith and spring for regulating the movement of said plunger.

Hathaway, U.S. Pat. No. 1,1079,704 describes a tire valve barrel having eccentric and parallel air and gage tube bores, the lower end of the latter bore having a primary and an eccentric secondary counter-bore and the upper end of the latter bore terminating short of the tip of the barrel, a mercury tube fitting in the bore and having its outer end closed and seated against the upper end of the bore, the lower end of the tube being open and entering the primary counter-bore, a packing ring in the counter-bore around the end of the tube, a diaphragm having its edges thickened and seated against the shoulder formed by the secondary counter-bore so as to space the diaphragm from the shoulder, and a binding ring screw-threaded into the secondary counter-bore and bearing against the thickened edge of the diaphragm to retain the diaphragm in position, a portion of the valve being cut away to expose the tube and bearing graduations.

The prior art teaches various tire pressure level indicators. However, the prior art does not teach that such a device may be used to show adequate, marginal and underinflated conditions in a tire. The present invention fulfills these needs and provides further related advantages as described in the following summary.

SUMMARY OF THE INVENTION

The present invention teaches certain benefits in construction and use which give rise to the objectives described below.

The present invention provides a tire pressure indicator mounted onto the fill stem of a tire and provides a window for indicating if the tire has adequate pressure or not. The indicator shows adequate, marginal and underinflated conditions by color bands opposite the window. The pressure indicator may be permanently mounted onto the tire and used to fill the tire and maintain pressure in the tire. As the tire is filled the indicator moves from one color band to the next until the indicator shows that adequate pressure has been attained whereupon the hose may be disconnected.

A primary objective of the present invention is to provide a pressure indicator having advantages not taught by the prior art.

Another objective is to provide such an indicator that is able to display pressure dynamically status as the tire is being filled.

A further objective is to provide such an indicator that is able to display multiple status levels depending upon tire pressure changes.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
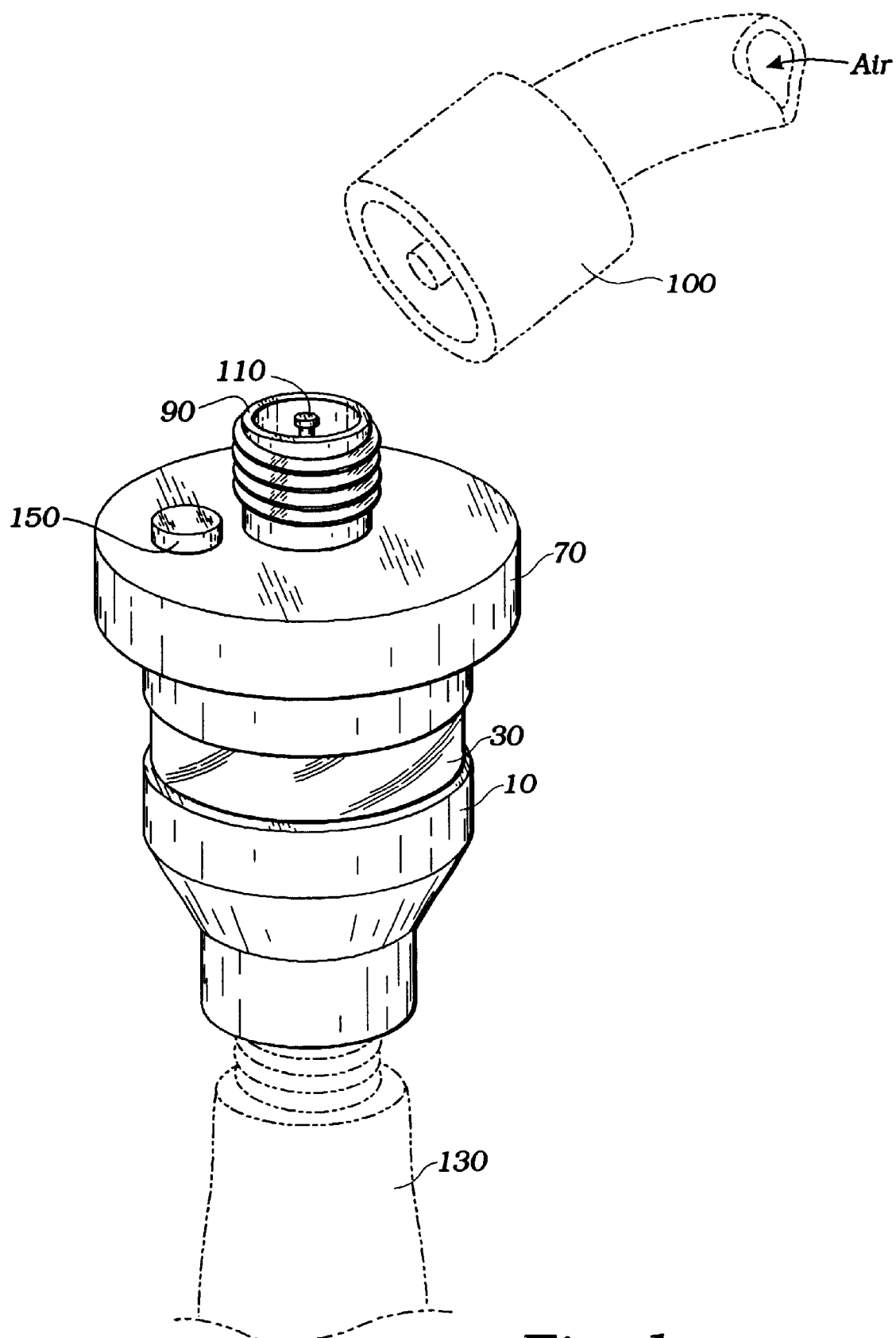
FIG. 1 is a perspective view of the preferred embodiment of the present invention as mounted onto a tire valve stem and as receiving an air hose bib.

The above described drawing figures illustrate the invention, an air valve and indictor apparatus comprising a cylindrical outer body 10 including an outer body sidewall 20 where a portion of this sidewall provides a sealed window 30 for viewing an indicator. As shown in FIG. 1, the window 30 is preferentially circumferential so as to be viewed from all sides. At one end (lower in FIG. 2) of the outer body 10 is a means, such as the centrally positioned rod shown, for valve depressing 40 and this is enabled by its extent and position for pushing open a tire stem valve which is not shown in the figures but is very well known in the art and a part of all modern tire valve stems, so that air flow is admitted through the apparatus into a tire. A cylindrical inner body 50 includes an inner body sidewall 60 integrally joined with an inner body capping means 70 extending annularly outwardly from the inner body sidewall 60. The capping means 70 is joined, preferably by the threads shown, with the outer body sidewall 20, at the other end thereof, so as to position the inner 60 and the outer 20 body sidewalls in mutually concentric positions about a longitudinal central axis 80 of the apparatus. The inner body sidewall 60 provides, at one end thereof, an airline receiving means 90, as is well known in the art, and which is adapted by its size and shape for receiving an air hose bib 100 as shown in FIG. 1, wherein the hose bib 100 is not a part of the present invention. An air valve 110 is engaged within the airline receiving means 90 for enabling air to be admitted into the inner body sidewall 60 and this is accomplished in the conventional manner. Arrow "A" shows the motion that air valve 110 is capable of. A valve biasing means (spring) 112 forces the valve 110 closed against an o-ring 114 for sealing the apparatus so that when the apparatus is mounted onto tire stem 130 it will contain the air within the tire.

Figure 2:
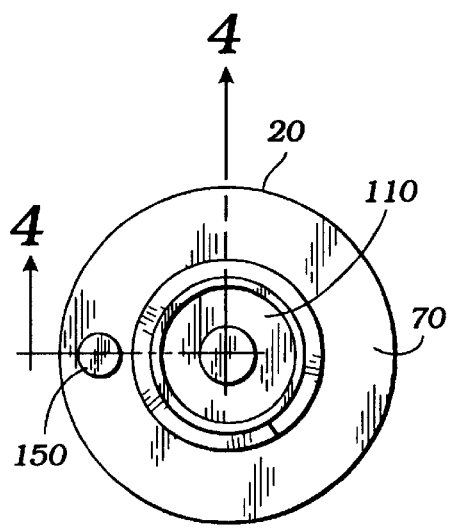
FIG. 2 is a vertical, one-half sectional view thereof as taken along line 2—2 in FIG. 1.
Figure 3:
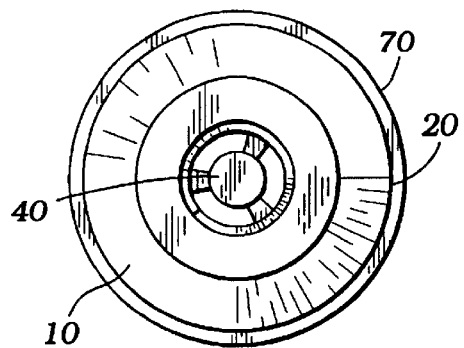
FIG. 3 is a lower plan view thereof taken in the direction of line 3 in FIG, 2 but displaying the fill object.
Figure 4:
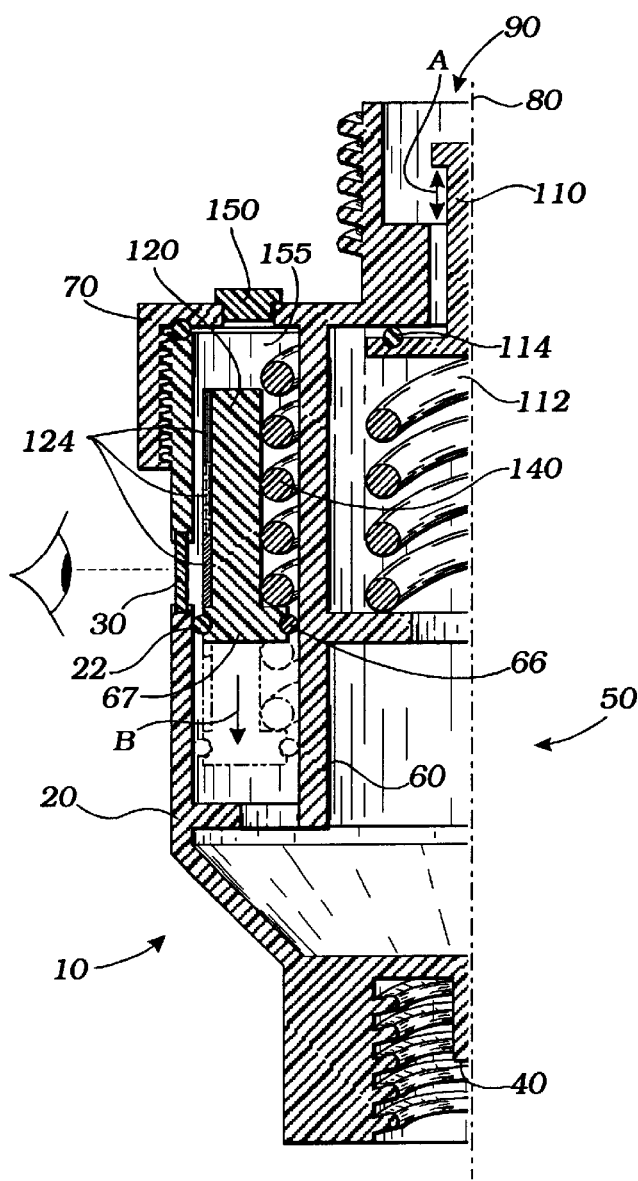
FIG. 4 is an upper plan view thereof taken in the direction of line 4 in FIG, 2 but displaying the full object.

A pressure level indicating means 120 is movably positionable between the inner 60 and outer 20 body sidewalls as shown in FIG. 2, and moves in response to the air pressure level introduced within the inner body sidewall 60 so as to provide an indication visible through the window 30. This pressure level indicating means 120 is inventively cylindrical and is slidably engaged and sealed between the inner 60 and outer 20 body sidewalls by circular sealing rings 22 and 66 on flange 67. The pressure level indicating means 120 includes an outer cylindrical surface upon which at least one indicator ring 124 is painted or otherwise positioned thereon. The at least one indicator ring is visible through the window 30 when the pressure level indicating means 120 is in at least one slidably engaged position as shown in FIG. 2. In the preferred embodiment the pressure level indicating means 120 provides three indictor rings 124; one green, one yellow and one red. When pressure is adequate in a tire (not shown) to which the apparatus is attached at its valve stem 130, i.e., high pressure, the pressure indicating means 120 is forced by the high tire pressure to move against a biasing means or spring 140 so as to display the green ring through the window 30 as shown in FIG. 4 in solid lines. When pressure in the tire falls, the pressure indicting means 120 is forced by the biasing spring 140 to move, according to the arrow marked "B" in FIG. 4 so as to display first the yellow ring and eventually the red ring through window 30. The yellow ring is calibrated by its position to indicate marginal tire pressure, while the red ring is calibrated by its position to indicate inadequate tire pressure. In an alternate scheme, the colored rings may be replaced with numbers or other indicators for identifying the level of pressure within the tire.

An access means 150 is provided for enabling air pressure reduction in a space volume 155 between the inner 60 and outer 20 body sidewalls, the pressure level indicating means 120 and the capping means 70 so as to further facilitate and enable motion of the pressure level indicating means 120. Such an access means may be a hole as shown in FIG. 4 sealed by a plate after air has been partially removed from space volume 155. Alternatively, the hole may be covered with a flap valve, which could be represented by FIG. 2 just as well, so that air within space volume 155 is evacuated when the indicating means 120 compresses spring 140 and is not permitted to reenter when the indicating means 120 moves in the direction of arrow B thereafter for relaxing the spring 140. In either case the air pressure in space volume 155 is reduced so as to allow indicating means 120 to move freely without the need to compress the air within the space volume 155 each time it compresses spring 140.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An air valve apparatus comprising:

a cylindrical body providing an outer cylindrical sidewall having a sealed window for viewing therethrough, the cylindrical body further providing an inner cylindrical sidewall concentric with the outer cylindrical sidewall;

the inner cylindrical sidewall providing at one end thereof and integral therewith, an air hose bib adapted by a spring biased valve for receiving air thereinto, and a capping means adapted for removably positioning the inner and outer cylindrical sidewalls in concentric positions;

the outer cylindrical sidewall further providing, integral therewith, a valve depressing means enabled for opening a tire stem valve for conducting air thereinto;

a movable cylindrical pressure level indicator positioned adjacent to the sealed window between the outer and inner cylindrical sidewalls;

the pressure level indicator terminating at one end with a flange extending sealingly between the inner and outer cylindrical sidewalls;

a biasing spring positioned between the flange and the capping means, the biasing spring compressible in response to air pressure changes within the apparatus so as to move the pressure level indicating means, thereby providing an indication of said air pressure changes through the sealed window.

2. The apparatus of claim 1 wherein the pressure level indicator includes an outer cylindrical surface having at least one indicator ring thereon, the at least on indicator ring being visible through the window when the pressure level indicator is in at least one slidably engaged position.

3. The apparatus of claim 2 wherein the helical biasing spring is adapted for moving the pressure level indicating means counter to the pressure within the cylindrical body.

4. The apparatus of claim 3 further including an access means for enabling air pressure reduction between the inner and outer sidewalls, so as to further enable motion of the pressure level indicating means.

5. The apparatus of claim 1 wherein the sealed window extends generally fully about the outer sidewall so as to enable viewing the indicating means from all angles.

* * * * *